Oct. 25, 1966 J. F. BAYHI ET AL 3,280,460

TRACE SYNTHESIZER

Filed Dec. 30, 1963 3 Sheets-Sheet 1

INVENTORS.
JOSEPH F. BAYHI,
ROBERT F. GREGORY,
CLARENCE O. BEARD,
BY Frank S. Troidl
ATTORNEY.

INVENTORS.
JOSEPH F. BAYHI,
ROBERT F. GREGORY,
BY CLARENCE O. BEARD,
Frank S. Troidl
ATTORNEY Oct. 25, 1966 J. F. BAYHI ET AL 3,280,460

TRACE SYNTHESIZER

Filed Dec. 30, 1963 3 Sheets-Sheet 3

INVENTORS.
JOSEPH F. BAYHI,
ROBERT F. GREGORY,
BY CLARENCE O. BEARD,
Frank S. Troidl
ATTORNEY.

United States Patent Office 3,280,460

Patented Oct. 25, 1966

3,280,460

TRACE SYNTHESIZER

Joseph F. Bayhi, Houston, Tex., Robert F. Gregory, Denver, Colo., and Clarence O. Beard, Houston, Tex., assignors, by mesne assignments, to Esso Production Research Company, Houston, Tex., a corporation of Delaware Filed Dec. 30, 1963, Ser. No. 334,369
3 Claims. (Cl. 33—1)

This invention relates to seismic prospecting. More particularly, this invention is an apparatus for forming synthetic seismograms.

In seismic prospecting for oil, the reflections on a seismic record can be traced to certain geologic layers in the earth by the use of a synthetic seismogram. The synthetic seismogram is usually made by use of a velocity survey of a nearby well bore and by complex electrical filtering or digital computer processing of the velocity survey information. The resulting synthetic seismic trace is compared with a conventional surface recorded trace to complete the desired identification. Usually the identification is not simple, and various costly changes must be made in the filtering or the computer programs to improve the matching of the two traces.

It is a purpose of this invention to provide a simple, low-cost, novel apparatus for constructing synthetic seismograms. The trace synthesizer to be described herein is portable and can be operated manually so that a synthetic seismic trace can be constructed by only one person from velocity log information within minutes. In addition to the advantages of simplicity and low cost, this device is excellent for training purposes, for instantly viewing the effects of certain changes in lithology, and for observing quickly the effects of various wave form changes analogous to electrical filtering.

Briefly described, the trace synthesizer comprises a plurality of individually movable parallel slides mounted within a support. Means are provided for permitting the movement of each of the slides a desired amount so that the movements of the plurality of slides result in the desired wave form.

The invention, as well as its many advantages, may be further understood by reference to the following detailed description and drawings in which.

Figures 1, 2, 3:
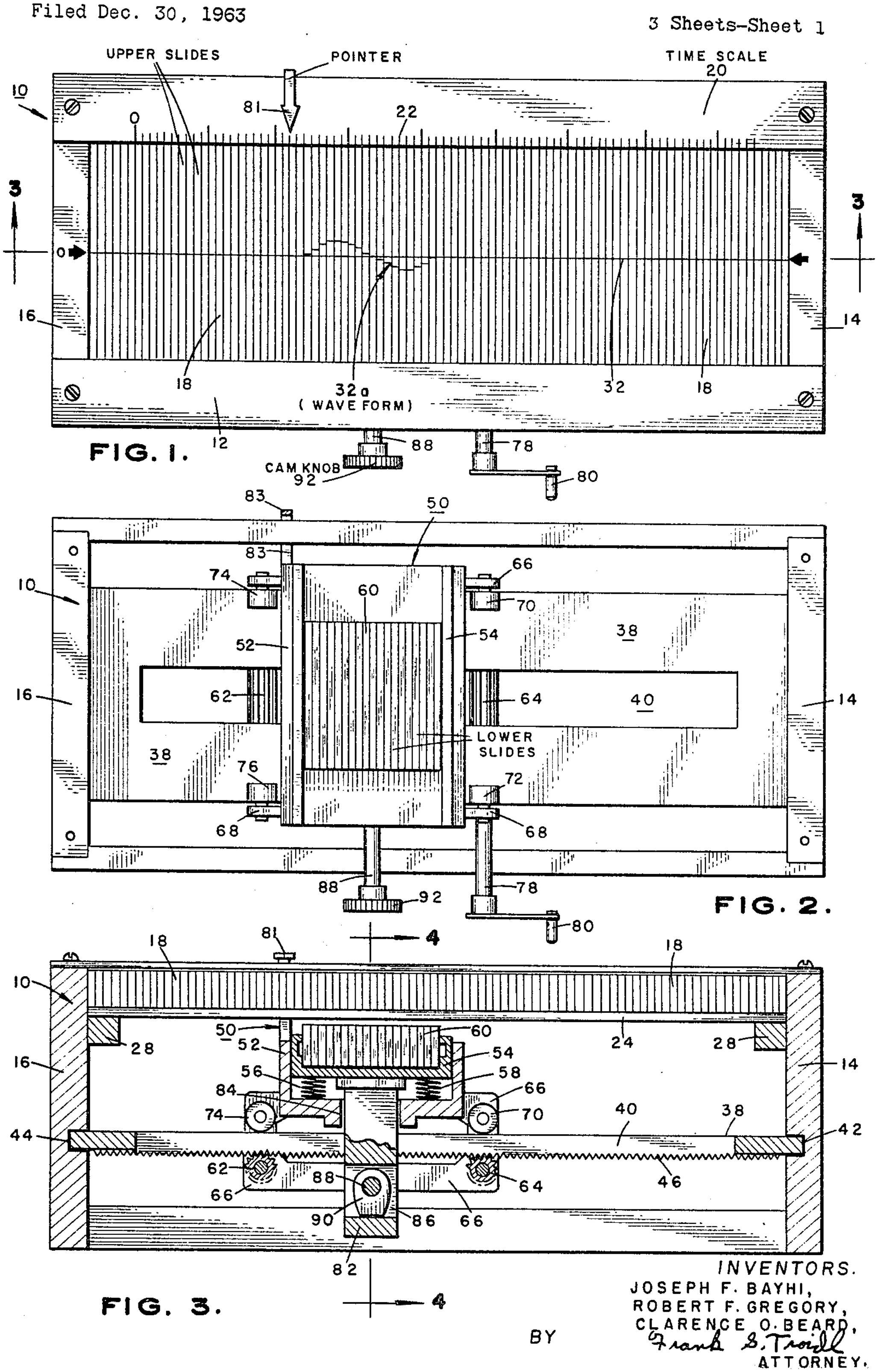
FIG. 1 is a plan view of one embodiment of the invention.
FIG. 2 is a plan view showing the lower assembly of the embodiment of FIG. 1.
FIG. 3 is a view taken along line 3—3 of FIG. 1.

Referring to the drawings and more particularly to FIG. 1, FIG. 2, FIG. 3, and FIG. 4, a support indicated generally by the numeral 10, including a side plate 12 and end plates 14 and 16, is used to support a plurality of individually movable parallel slides 18. A time scale member 20 including the graduations 22 is also included as part of the support 10.

Figures 4, 5, 6, 7, 8:
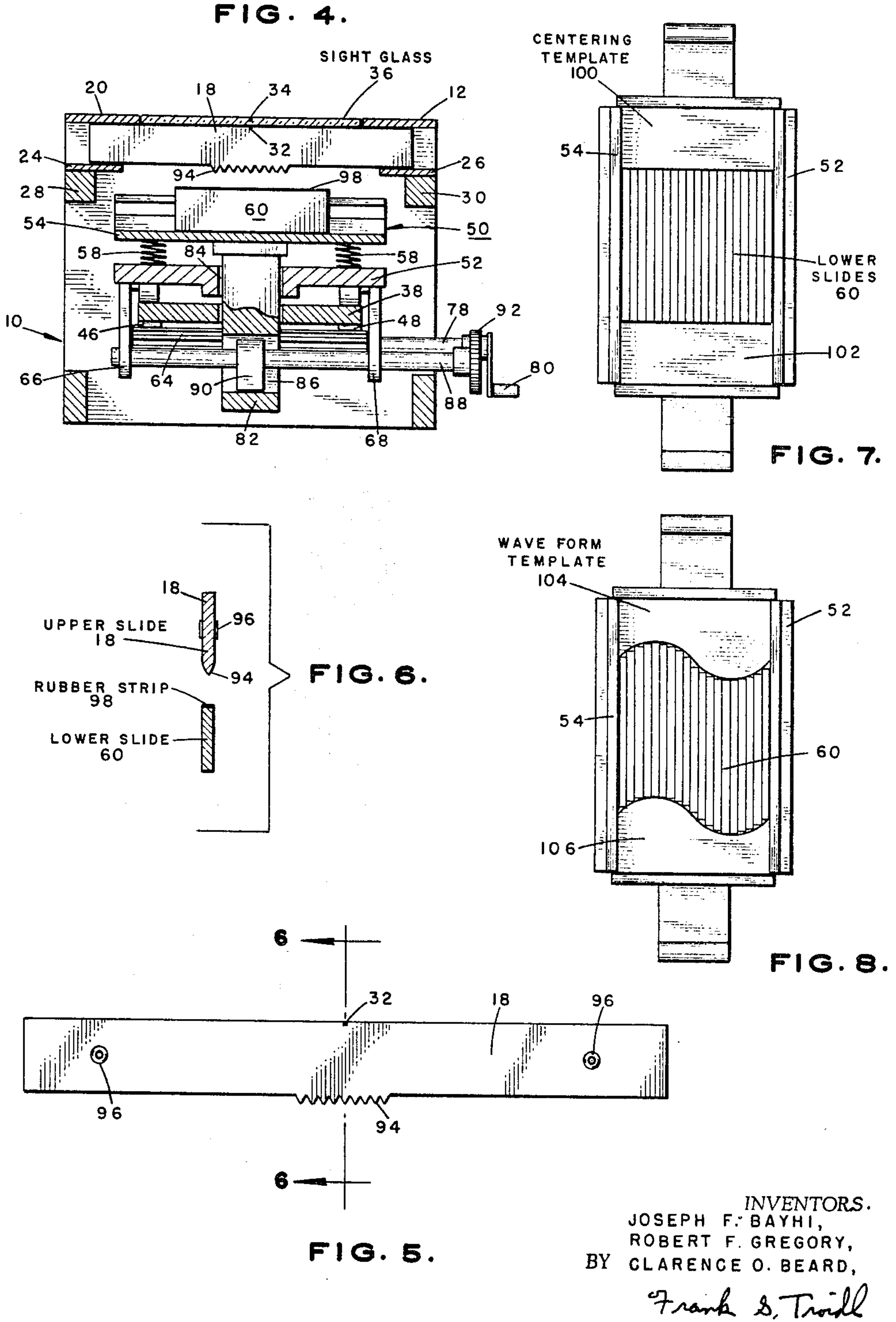
FIG. 4 is a view taken along line 4—4 of FIG. 3.
FIG. 5 is a detailed view on an enlarged scale of one of the upper slides.
FIG. 6 is a view taken along line 6—6 of FIG. 5.
FIG. 7 is a plan view showing the insertion of centering templates into the template receiver.
FIG. 8 is a view similar to FIG. 7 showing the insertion of complementary signal templates into the template receiver.

As shown in FIG. 3 and FIG. 4, a pair of longitudinally extending slide supports 24 and 26 is mounted upon mounts 28 and 30, respectively. The slide supports 24 and 26 are spaced below time scale 20 and side plate 12, respectively, a sufficient distance so that the plurality of individually movable parallel slides 18 is slidable within the thus-provided spaces.

Each of the slides 18 is provided with a central index 32. (See FIGS. 1 and 5.) Each of the indexes 32 is in line with a center line 34 formed on a transparent view plate 36 when the slides 18 are centered within the support 10.

Referring to FIG. 2 and FIG. 3, a gear rack support 38 having a longitudinal slot 40 formed centrally therein is mounted within grooves 42 and 44 formed in end plates 14 and 16, respectively. A pair of gear racks 46 and 48 is mounted on the longitudinal edges and underside of the gear rack support 38.

A movable template means indicated generally by the numeral 50 is mounted for longitudinal movement along the gear racks 46 and 48. The template means 50 includes a carriage 52 in which is mounted a template receiver 54. The template receiver 54 is biased upwardly by coil springs 56 and 58 mounted on the carriage 52 and below the base of template receiver 54. A plurality of individually movable lower slides 60 is mounted for slidable movement within the template receiver 54.

A pair of roller pinions 62 and 64 is in contact with the gear racks 46 and 48. The roller pinions 62 and 64 are connected to pinion supports 66 and 68 which, in turn, are integrally connected to the carriage 52. Rollers 70 and 72 are connected to the pinion supports 66 and 68, respectively, and above the roller pinion 64. Rollers 74 and 76 are connected to the pinion supports 66 and 68, respectively, and above the roller pinion 62. Movement of the template means longitudinally along the gear racks 46 and 48 is accomplished by means of a shaft 78 extending through the pinion 64 and operated by manually turning the crank 80. A pointer 81 connected to bracket 83 extending from pinion support 66 indicates the position of the template means 50 along time scale 20.

A plunger 82 is integrally connected to the underside of template receiver 54. The plunger 82 extends downwardly through bore 84 in the bottom of carriage 52 and slot 40 in gear rack support 38. The plunger 82 is provided with a bore 86. A camshaft 88 extends through the bore 86 and is supported by the pinion supports 66 and 68. An eccentric cam 90 is mounted on camshaft 88 and within the bore 86 of plunger 82. The camshaft 88 is turned by means of cam control knob 92.

FIG. 5 is a view showing one of the slides 18 on an enlarged scale. Each of the slides 18 has formed on the bottom thereof serrations 94 extending for a short distance from each side of the center. Alternate slides 18 have small bushings or protuberances 96 mounted on each side. The protuberances 96 provide a slight separation and a small amount of frictional contact between the slides. As shown in FIG. 6, each of the lower slides 60 has mounted on the top thereof a rubber strip 98. When a slide 60 is moved upwardly into contact with the lower portion of a slide 18, the serrations 94 come into gripping contact with the rubber strip 98. Hence, transverse movement of a lower slide 60 will cause a corresponding transverse movement of an upper slide 18.

As shown in FIG. 7, the lower slides 60 are centered in the template receiver 54 by centering templates 100 and 102 which are inserted in the ends of the template receiver 54.

When it is desired to impose a seismic trace on the upper slides 18, complementary signal templates 104 and 106 are inserted in the template receiver 52. The complementary signals are formed on the edges of the complementary signal templates 104 and 106.

In operating the embodiment shown in FIGS. 1 through 8, the upper slides 18 and the lower slides 60 are centered in the support 10 and template receiver 54, respectively. The template means 50 is placed in a position so that the pointer 81 is opposite a time line corresponding to the depth of the first geologic layer on the velocity survey to be synthesized. The cam control knob 92 is then turned to a position to permit the springs 56 and 58 to move the slides 60 into engagement with the slides 18. Templates, such as templates 104 and 106 which have been cut to fit a desired signal wave form, are then inserted in the template receiver 52. The resulting movements of the slides 60 cause corresponding movements of an equal number of slides 18. The wave form is shown by displacement of the indexes 32 as illustrated at 32*a* in FIG. 1.

The cam control knob 92 is then turned until the cam 90 is in the position shown in FIG. 3 and FIG. 4. The cam 90 pulls the plunger 82 and the integral template receiver 54 along with the slides 60 downwardly out of engagement with the slides 18. Thereafter, the centering templates 100 and 102 are inserted in the template receiver 54 to again center the slides 60.

The handle 80 is then turned to move the entire template means 50 to the next position along the time scale 20 corresponding to the depth of the second geologic layer on the velocity survey to be synthesized. The desired signal templates are then inserted in the template receiver 52. The cycle is repeated until the entire synthetic trace is formed by the slides 18.

The apparatus is designed to allow insertion of signal templates 104 and 106 at any position along time scale 20 including an overlap of the wave form obtained from a previous insertion. Thus, the resulting synthetic trace consists of an algebraic sum of signal wave forms inserted along the entire time scale 20.

Figures 9, 10, 11:
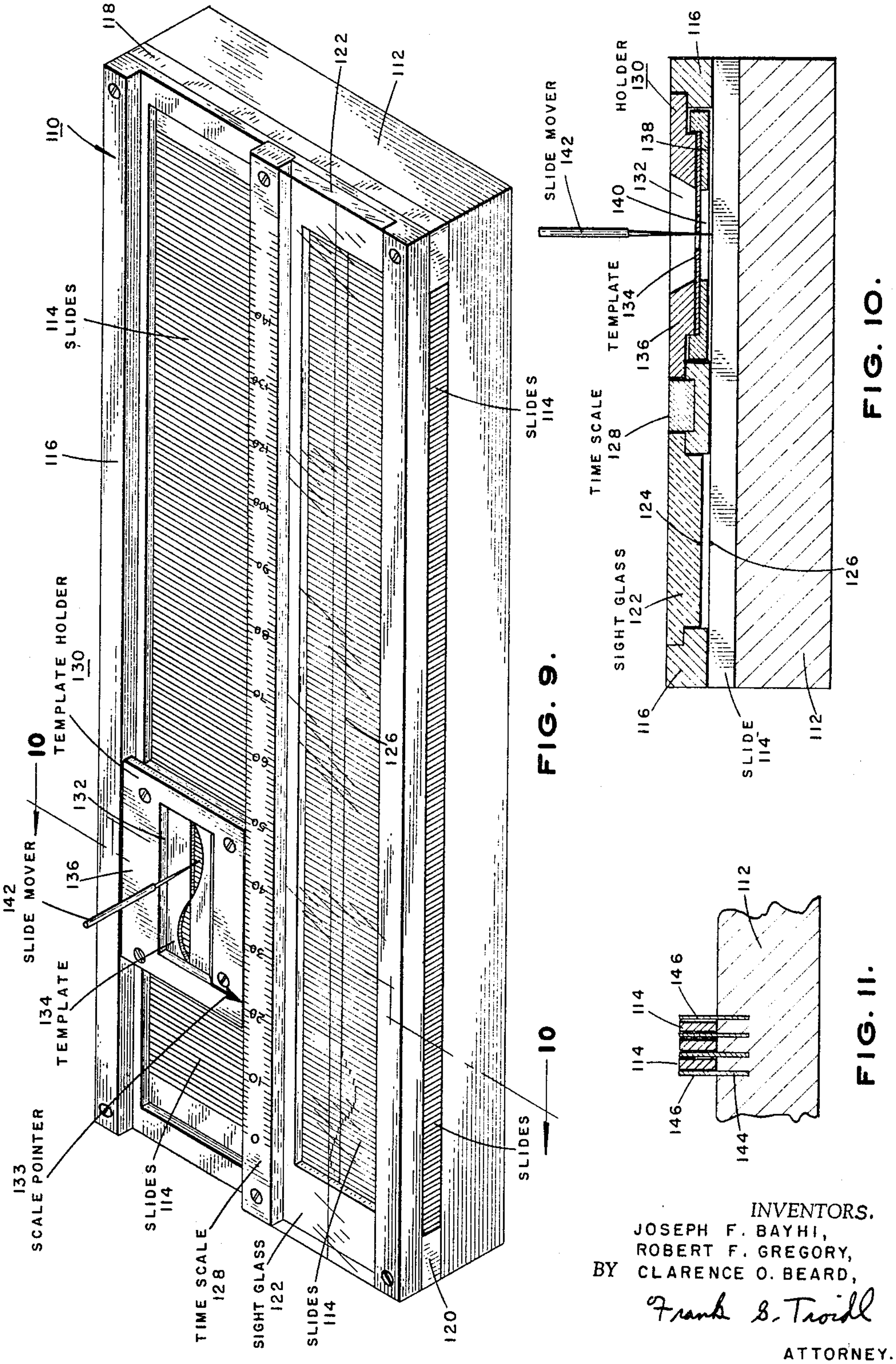
FIG. 9 is a perspective view of a second embodiment of the invention.
FIG. 10 is an enlarged, sectional view taken along line 10—10 of FIG. 9.
FIG. 11 is a fragmentary view on an enlarged scale showing the manner in which the slides are mounted on the base member of the embodiment of FIG. 9.

A second embodiment of the apparatus is shown in FIGS. 9 through 11. As shown in FIG. 9, a support indicated generally by the numeral 110 includes a base 112. A plurality of individually movable parallel slides 114 extends the full width of the base 112 and is free to move in either direction.

A top plate 116 is mounted at each end to spacer blocks 118 and 120. The spacer blocks 118 and 120 are, in turn, mounted upon the base 112 so that the spacer blocks 118 and 120 are located between the top plate 116 and the base 112 at each end of the group of slides 114.

A transparent view plate 122 having a center line 124 (see FIG. 10) scribed on its lower surface is inlaid in the top plate 116 directly above the slides 114. Each of the slides 114 has an index 126. The indexes 126 are aligned with the center line 124 when the edges of the slides 114 are flush with the edges of the base 112.

A graduated time scale 128 is attached to the center of the top plate 116. The other half of the top plate 116 is machined to form a race for the template receiver 130. The template receiver 130 is slidable along the full length of the race. The template receiver 130 is provided with a slot 132 and a pointer 133. A template card 134 having formed therein the desired seismic signal is mounted in the template receiver 130. The seismic signal on the template card 134 is visible through the slot 132 when the template card 134 is mounted in the template receiver 130.

The template card 134 has been prepared by first marking the signal wave form. This outline is then traced with a sharp knife. After the wave form has been traced, a straight cut is made along the center line from the top to the bottom of the wave form. The amplitude swings of the signal then fall out, and a template of the signal outline then remains.

As shown in FIG. 10, the template receiver 130 includes an upper template receiver member 136 and a lower template receiver member 138. The template card 134 is placed in the lower template receiver member 138. The members 136 and 138 are then screwed together. The lower template receiver member 138 is provided with a slot 140 so that a needle-type instrument 142 can be inserted through the template card 134 and into contact with one of the slides 114.

As shown in FIG. 11, the base 112 is provided with a number of equally spaced grooves 144. Into these grooves are fitted thin strips of metal 146 which, in turn, form containing tracks for a matching number of slides 114.

In operating the embodiment shown in FIGS. 9 through 11, the needle-type instrument 142 is inserted through the wave form; and a light pressure is exerted against the slides 114. The slides 114 may be moved in either direction. A movement starting at the center line of the wave form 134 and proceeding to the wave outline will result in a positive registration. A minus registration results when the procedure is reversed. These movements may be repeated for addition or subtraction of the wave form. By moving the template receiver 130 along the scale 128 and imposing the desired wave form, a composite wave form will be indicated beneath the view plate 122 by the indexes 126.

We claim:

1. An apparatus for forming synthetic seismograms comprising: a support; a plurality of individually movable parallel slides mounted for transverse movement on the support; template means mounted in the support and movable in a direction perpendicular to the longitudinal axes of the plurality of individually movable parallel slides and including a template receiver; a time scale mounted on the support; and means permitting movement of the template means along the time scale.

2. An apparatus in accordance with claim 1 wherein the template receiver has a slot formed therein for receiving a template having the desired wave form.

3. An apparatus for forming synthetic seismograms comprising: a support; a plurality of individually movable parallel slides mounted for transverse movement on the support; template means movably mounted in the support, said template means including a template receiver having a plurality of individually movable parallel slides mounted thereon for transverse movement by templates; a time scale mounted on the support; means for moving the template means along the time scale; and means for moving the template receiver to provide gripping contact of the slides on the template receiver with an equal number of the slides mounted on the support whereby the template receiver may be moved to cause the slides on the template receiver to contact an equal number of slides mounted on the support, and templates inserted in the template receiver to move the slides on the template receiver to thereby move an equal number of slides mounted on the support to positions to provide wave forms corresponding to the wave forms of the templates.

References Cited by the Examiner

UNITED STATES PATENTS

| | | | |
|---|---|---|---|
| 2,821,792 | 2/1958 | Marzani | 33—175 X |
| 3,143,055 | 8/1964 | Alexander | 33—1 X |

LEONARD FORMAN, *Primary Examiner.*

ISAAC LISANN, *Examiner.*